United States Patent [19]
Osborne

[11] 3,888,326
[45] June 10, 1975

[54] AUTOMATIC OR MANUAL MULTI-SPEED TRANSMISSION FOR ELECTRICALLY PROPELLED VEHICLES

[76] Inventor: Gordon W. Osborne, 180 Raeburn Ave., Rochester, N.Y. 14619

[22] Filed: Mar. 19, 1974

[21] Appl. No.: 452,636

[52] U.S. Cl............. 180/65 R; 74/359; 74/665 L; 192/48.2
[51] Int. Cl............................................ B60k 17/12
[58] Field of Search ....... 180/65 R, 70 R; 74/665 L, 74/665 GE, 665 T, 331, 359, 360; 192/84 AA, 84 C, 48.9, 48.2

[56] References Cited
UNITED STATES PATENTS

| | | | |
|---|---|---|---|
| 2,936,054 | 5/1960 | Simon et al. | 192/84 C |
| 3,192,798 | 7/1965 | Twamley | 74/359 |
| 3,202,234 | 8/1965 | Osborne | 180/65 R |
| 3,318,167 | 5/1967 | Frost | 74/331 |

*Primary Examiner*—David Schonberg
*Assistant Examiner*—David M. Mitchell
*Attorney, Agent, or Firm*—Peck & Peck

[57] ABSTRACT

A manual or automatic industrial, golf or pleasure vehicle, or the like, which is electrically propelled by batteries and is provided with a multi-speed transmission whereby the speed of the vehicle may be changed while the speed of the electric motor remains at all times constant and is not altered by resistance or low voltage switching.

15 Claims, 7 Drawing Figures

PATENTED JUN 10 1975 3,888,326
SHEET 3

AUTOMATIC OR MANUAL MULTI-SPEED TRANSMISSION FOR ELECTRICALLY PROPELLED VEHICLES

BACKGROUND OF THE INVENTION

1. Field of the Invention

The present invention relates generally to vehicles of the industrial or pleasure type which are electrically propelled by means of batteries and are unique in many respects, one of which is the provision of means for varying the vehicle speed while the speed of the electric motor remains constant so that there is no necessity for changing the speed of the motor by resistance or low voltage switching, which switching produces a high load on the batteries and thereby substantially reduces the battery charge thereby necessitating frequent recharging.

2. Description of the Prior Art

In many industrial uses of vehicles of this character which are electrically propelled in the manner described above, it is highly desirable that the speed of the vehicle be regulable. For instance, when such vehicles are used in industry, it may be operated at a slower speed within a building but when on the exterior thereof, in a street for instance, it is desirable to travel at a higher speed so as to not delay the movement of other vehicles. Similarly, in pleasure vehicles such as golf carts and the like, it is also desirable to vary the speed of travel of such carts.

As far as I am aware, in vehicles of this character which are now known in use and where the speed of the vehicle may be changed, such speed change is accomplished by resistance or low voltage switching which produces a severe strain on the batteries so that frequent recharging thereof is necessary.

This invention has overcome the handicap of known prior art vehicles of this character by providing an automatic or hand operated multi-speed transmission which is operable to vary and control the speed of the vehicle while the speed of the electric propulsion motor remains constant, thus substantially reducing the strain on the batteries.

SUMMARY OF THE INVENTION

This invention has been specifically designed to overcome a number of substantial drawbacks which are now inherent in industrial, golf and the like carts having electric propulsion means which are powered by batteries. As I have stated above, the change of speed in such vehicles has heretofor been accomplished by resistance or low voltage switching which produces a drain on the batteries so that their recharging must be frequent. This invention eliminates resistance and low voltage switching to produce different speeds in the vehicle and this has been accomplished by a unique variable speed transmission which is operated either electrically or by manual means.

The character of the apparatus is relatively simple and under normal usage should be endowed with long life characteristics and should not require any substantial maintenance difficulties.

DESCRIPTION OF THE INVENTION

Figure 1:
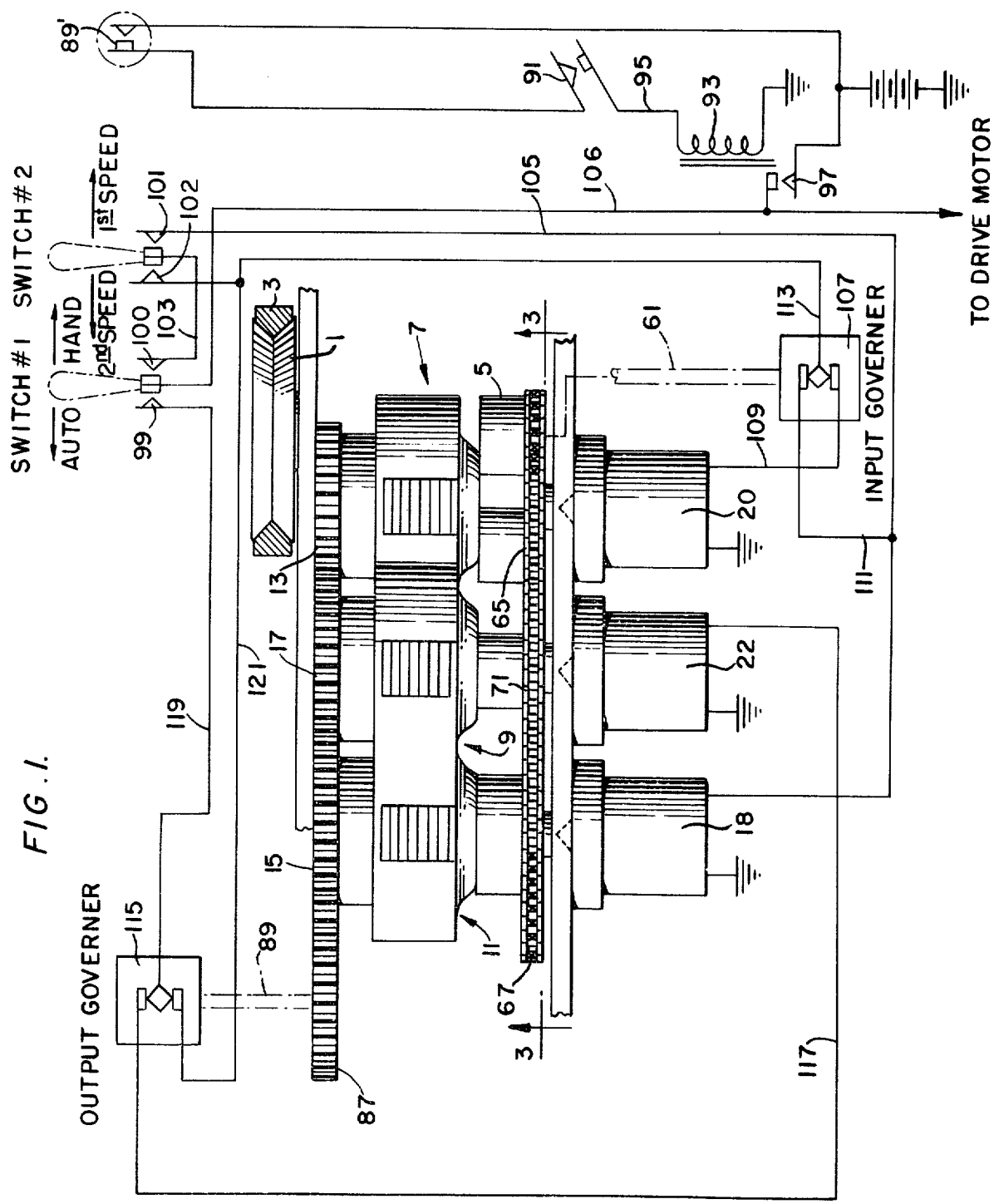
FIG. 1 is a composite illustration of the structural elements of the transmission and the electrical circuit employed for controlling the operation of the transmission, with the positions of the output gear and the third speed gear changed to more clearly illustrate the structure and operation of the apparatus.
Figure 2:
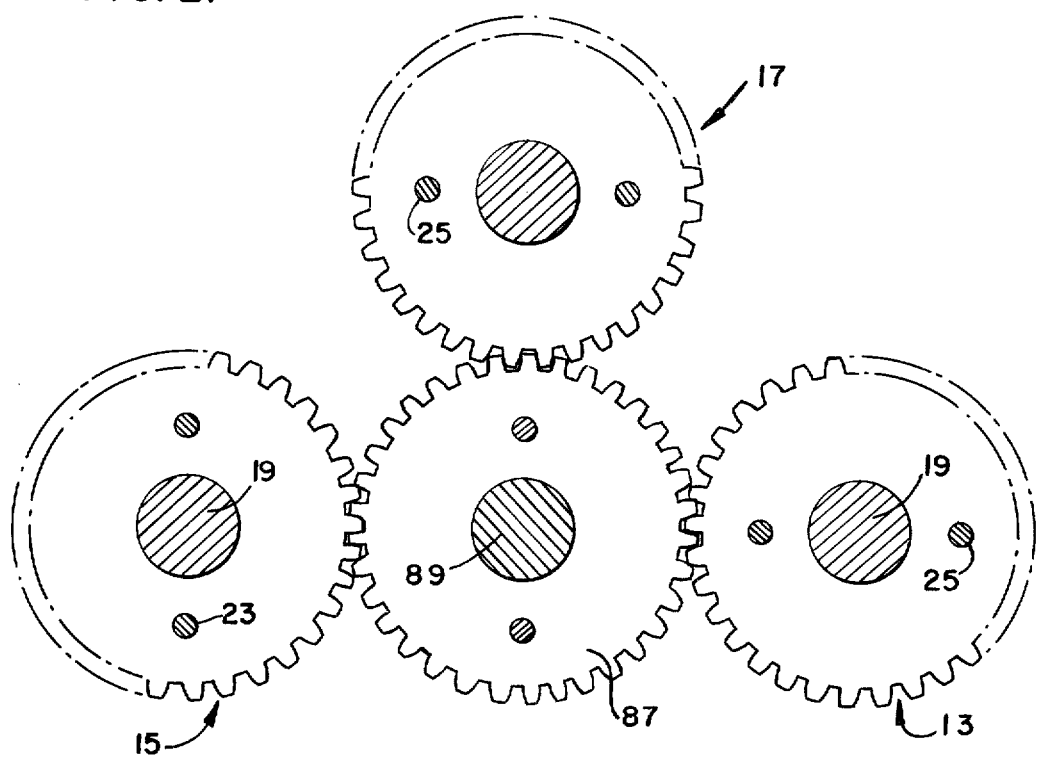
FIG. 2 is a plan view of the gear train including the output gear.
Figure 3:
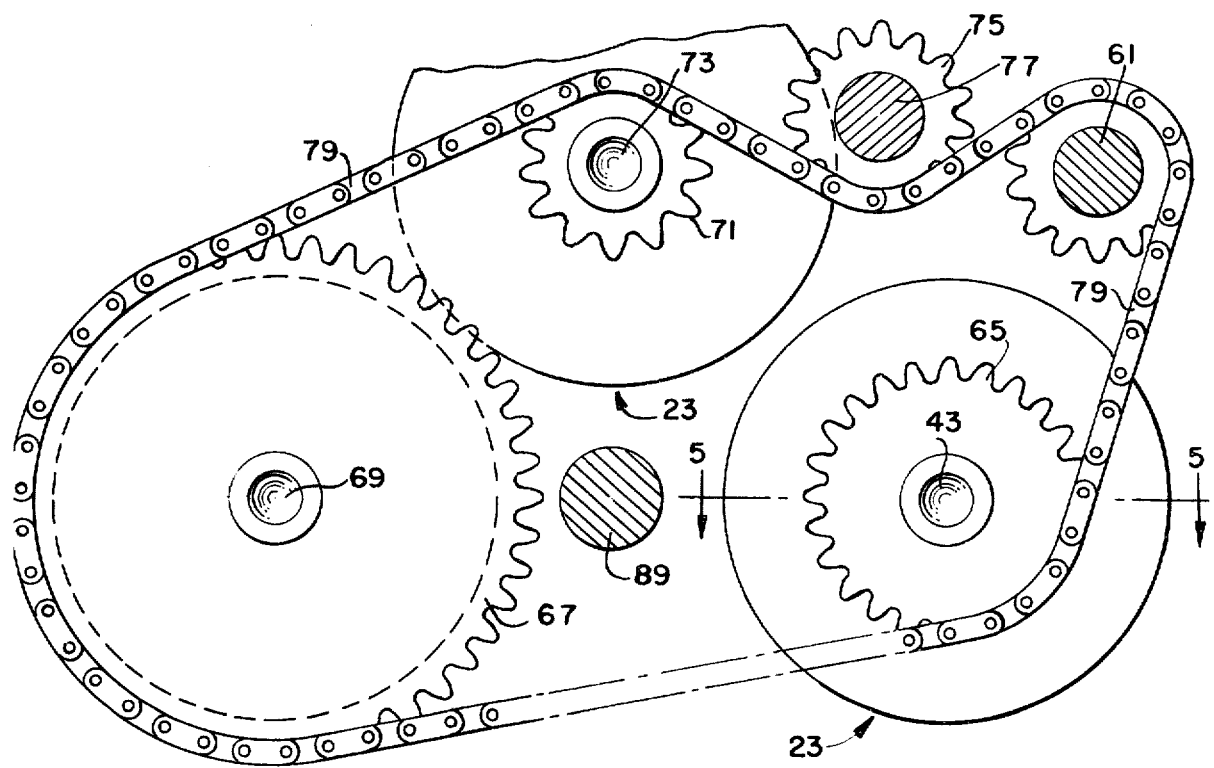
FIG. 3 is a view taken on the line 3—3 of FIG. 1.
Figure 4:
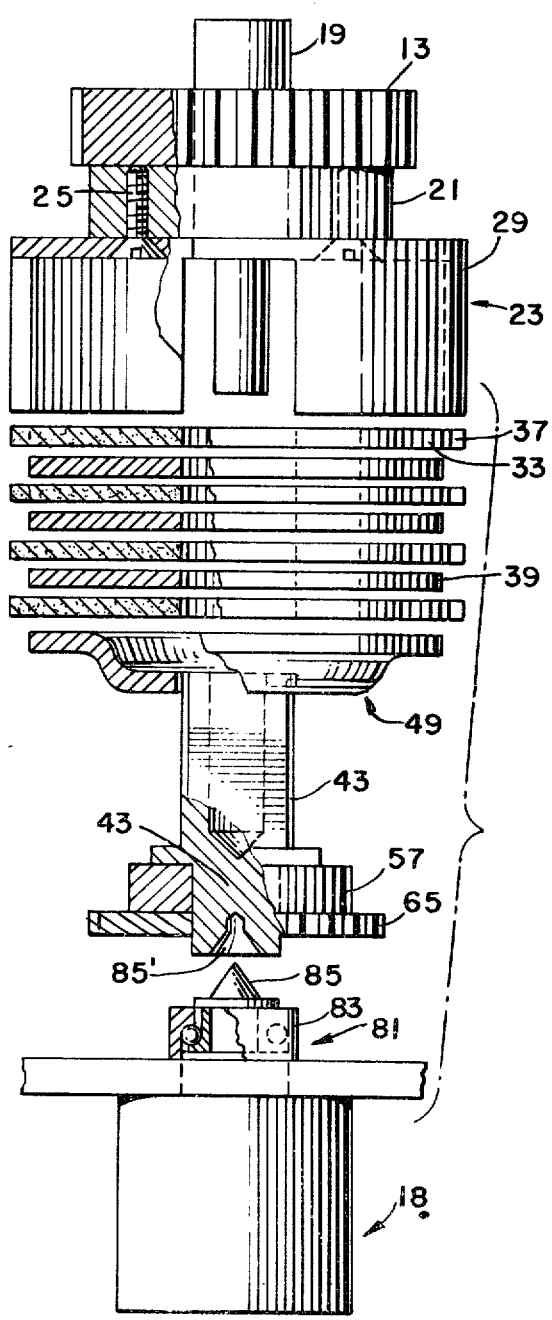
FIG. 4 is an enlarged detailed view of one of the clutches provided in the transmission, with the clutch illustrated in inoperative position and exposed for purposes of illustration.

The invention provides in a golf, industrial or other pleasure vehicle an electric propulsion means (not shown) which, as will be explained in detail hereinafter, provides the basic motive power for the vehicle. A pulley 1 receives a power belt 3 from the electric motor, the pulley being rotated by the belt 3, a main input shaft 61 (see FIG. 3) is fixed to the pulley for rotation therewith. At the end of the shaft opposite to the end which is fixed to the pulley 1, the shaft is fixed to a member 5 so that the member 5 will rotate with the shaft, the member 5 being provided with a ten tooth sprocket 6, which I shall term the input sprocket. The three-speed transmission includes three clutching assemblies which are designated generally by the numerals 7, 9, and 11, which clutching assemblies control the operation and rotation of the gears 13, 15 and 17, comprising the three speed transmission for the vehicle. The gear 15 constituting the first speed gear. The gear 13 constituting the second speed gear and the gear 17 constituting the third speed gear.

Three solenoids 18, 20, 22 are provided, the solenoid 18 controlling the operation of the clutching assembly 11, the solenoid 20 controlling the operation of the clutching assembly 7 and the solenoid 22 controlling the operation of the clutching assembly 9. It will be appreciated that the operation of the clutching assemblies 7, 9 and 11 controls the operation of the gears 13, 17 and 15 respectively. It is to be understood that a solenoid and clutching mechanism is provided for each of the three gears 13, 15 and 17 and since each of these clutching mechanisms is structurally and operationally similar, I shall now describe in detail only one of them. The clutching mechanisms are unique in their structure and operation and each such mechanism controls the operation of one of the gears 13, 15 and 17 so that when one of the clutching mechanisms is in operative clutching position, its specific gear, of the three-gear gear train will be operated and the output shaft of the vehicle will be actuated to operate the vehicle at the specific speed of the said specific operating gear, all as will be explained in detail hereinafter.

The example to be now described in detail concerns the operation of the second speed gear 13 which is fixed on what I shall term the gear output shaft 19 for rotation therewith. A face of the gear 13 has a hub 21, and I provide an inverted steel cup-like member designated generally by the numeral 23, which is fastened to the hub 21 by screws, or the like, 25 so that the cup-like member, hub 21 and the gear 13 will rotate together. The cup-like member is provided with a base or bottom 27 and an annular side wall 29 extends therefrom.

The annular side wall 29 of the cup-like member 23 is machined to provide four slots 31 disposed circumferentially about the annular sidewall 29 at 90° apart. These slots extend from the base 27 and at their other end are open-ended. The clutching elements are operable within the cup-like member 23 and co-act therewith to cause rotation of the cup-like member, the hub and the gear 13 when the clutching mechanism is operated to clutching position. The means whereby this clutching mechanism is operated will be fully described hereinafter. Operable within the cup-like member 23 are a plurality of friction discs 33, and I have found that four such discs function as desired. The friction discs are formed of any suitable friction material, such as brake lining material. Each such disc 33 is formed with a central annular opening 35 therein and is formed with four radial projections 37 extending from the disc 33 and being circumferentially spaced apart by 90° so as to extend into the slots 31 which are provided in the annular wall 29 of the cup-like member 23. I also provide a plurality of, what I shall term, pressure discs 39, three such discs 39 being used in the assembly when four friction discs 31 are used therein. Each pressure discs 39 is provided with a centrally disposed rectangular opening 41 therein. When the discs 33 and 39 are operatively assembled for clutching and de-clutching operation with the cup-like member 23, the pressure discs 39 are alternately disposed therein between the friction discs 33.

Figure 5:
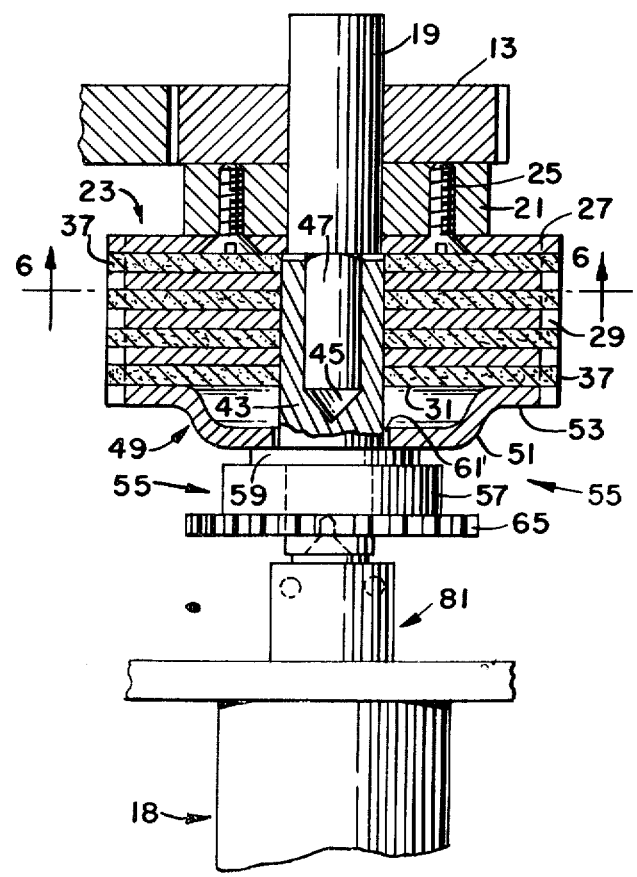
FIG. 5 is a view generally similar to FIG. 4 showing the clutching elements in operative position under the influence of the energenized solenoid for that particular clutch mechanism.
Figure 6:
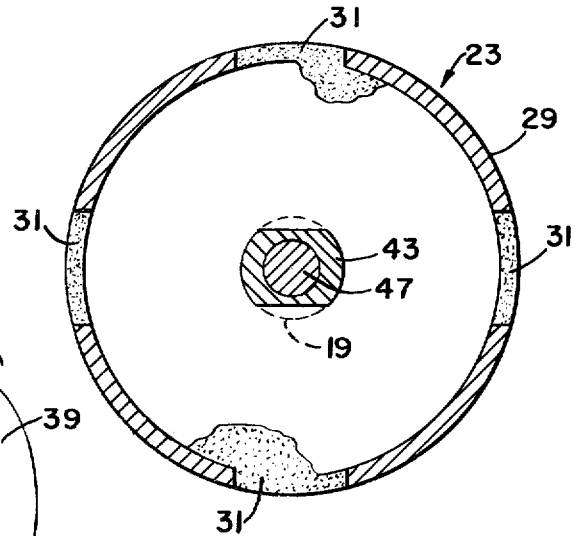
FIG. 6 is a view taken on the line 6—6 of FIG. 5.
Figure 7:
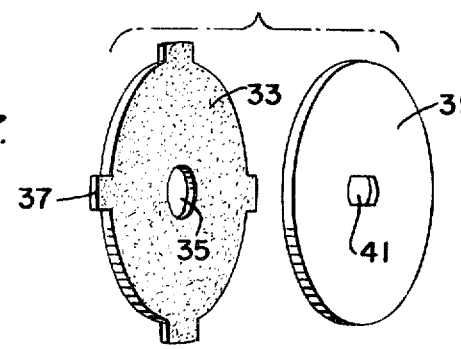
FIG. 7 is an exploded view disclosing a friction disc and a pressure disc each of which is a component of the clutch assembly.

A gear input shaft 43 is provided and this gear input shaft 43 is of generally rectangular configuration as clearly illustrated in FIG. 6 of the drawings, the gear input shaft extends into the cup-like member 23 and through the apertures 35 of the friction discs 33 and the apertures 41 of the pressure discs 39. It will, therefore, be recognized that when the gear input shaft 43 is rotated, the pressure discs, die to the configuration of the apertures 41, will rotate therewith and when the discs 33 and 39 are compressed and forced against each other in clutching operative positions as illustrated in FIG. 5, the friction discs 33 will be caused to rotate resulting in the rotation of the cup-like member 33 due to the reception of the projections 37 in the slots 31 in the annular wall of the cup-like member 23. This rotation of the cup-like member 23 will cause rotation of the second speed gear 13. The end of the gear input shaft 43 which is operatively positioned within the cup-like member 23 is provided with an annular opening 45 therein, which opening may comprise a bronze bearing, and this opening receives a reduced diameter projection 47 which is formed on the end of the gear output shaft 19. The recess 45 in gear input shaft 43 and the projection 47 are each cylindrical so that, as will be explained, the gear input and output shafts rotate independently of one another.

Fixed on the gear input shaft 43 is a pressure plate designated generally by the numeral 49, the pressure plate 49 is provided with a base 51 which is centrally apertured so that the gear input shaft 43 may fixedly extend therethrough. The pressure plate 49 is formed with an annular pressure flange 53, the O. D. of the annular flange being substantially equal to the I. D. of the inverted steel cup member 23 so that the pressure plate 49 may, as will be explained, slide within the inverted steel cup 23.

In position below the pressure plate 49 is fixed against axial movement on the gear input shaft 43 a hub designated generally by the numeral 55. This hub comprises a base portion 57 and a reduced diameter pressure member 59, the reduced diameter pressure member 59 being of greater diameter than the central opening 61' in the pressure plate 49.

The main input shaft 61 (see FIG. 3), which is fixed to the pulley 1 so that it will rotate with said pulley under the action of the electric propulsion motor, as stated, is provided with a sprocket 6, the sprocket 6 being fixed to input shaft 61 for rotation therewith, the sprocket 6 being a ten-toothed sprocket. A twenty-tooth sprocket 65 is fixed to the second speed gear input shaft 43 for rotation therewith. A thirty-tooth sprocket 67 is fixed to the first speed gear input shaft 69 for rotation therewith. A ten-tooth sprocket 71 is fixed to the third speed gear input shaft 73 for rotation therewith. Each sprocket is provided with a hub 55. Between the main input shaft 61 and the third speed gear input shaft 73 is a ten-tooth idler sprocket 75 mounted on a shaft 77. A drive chain 79 is operatively connected to all of the sprockets 6, 65, 67, 71 and 75 so that it will thus be recognized that when the main input shaft 61 is operating, the chain 79 will produce rotation of each sprocket and each gear input shaft of the gear train, the gear ratios being such that the desired variable speeds may be attained. It should be understood that this description constitutes only one example and either more speeds or less speeds may be provided.

Returning to the description of the gear input and output shafts 43 and 19, respectively, and the clutching mechanism 23, for control of the second speed gear, it will be clear that the sprocket 65 is fixed on the gear input shaft 43 so that it does not have axial movement relative to said shaft or relative rotational movement with respect thereto. Thus, when the sprocket 65 is rotated by means of the main input shaft 61 and the chain 79, the gear input shaft 43 will also be rotated and, as will be made clear hereinafter, when the clutching mechanism 23 is in inoperative, non-clutching position, the gear input shaft 43 may rotate relative to the gear output shaft 19.

It is to be particularly understood that each gear 13, 15 and 17 of the gear train involved in this transmission is provided with a clutching mechanism 23 and a single solenoid means for actuating the clutching mechanism and that all of these are of similar construction and operation to that disclosed in FIG. 5 and particularly described above.

Since each solenoid 18, 20 and 22 is structurally and operationally the same, I shall describe only one in detail. A transmission case houses the various structure which has been described, with the exception of the solenoids which are mounted in any suitable manner and in proper positions externally of the transmission case. The various shafts are properly journaled within the case in any manner within the ordinary skill of the art.

Each solenoid comprises an armature designated generally by the numeral 81 and the armature mounts on its outer end a ball bearing 83 to which is fixed a conical shaped pressure projection 85. The end of the input gear shaft 43, which shaft is in alignment with the pressure projection 85, is provided with a conically shaped recess 85' therein which is adapted to receive projection 85. Thus, upon energization of the solenoid, the armature 81 is projected and the pressure projection 85 is received in recess 85' and presses and forces shaft 43 toward the clutching mechanism to compress the clutching elements as shown in FIG. 5. Since sprocket 65 is rotating, shaft 43 and elements 57 and 59 will rotate but armature 81 will not due to pressure projection 85 being mounted on ball bearing 83.

With the gear input shaft 43 rotating as just described and with the elements of the clutching assembly compressed by the thrust plate 49 under the action of the solenoid 18, the inverted steel cup 23 will be caused to rotate, thus causing the rotation of the second speed gear 13. The second speed gear 13 is rotating at approximately ten miles per hour so that the rotation of the output gear 87, which is in mesh with the second speed gear 13 will be the same. The output gear 87 is fixed to a main output shaft 89 which is the drive shaft for the vehicle and also is connected to an output governor, as will be explained hereinafter. The output gear 87 is also in mesh with the first speed gear 15 and the third speed gear 17. With the clutching assembly 7 in operative clutching position, the output gear 87 will be operated at the second speed, and the first and third gears, 15 and 17 respectively, will, of course, rotate as will their gear output shafts 19 which, as has been noted above, are the same as and function the same as this gear output shaft 19 which has been described in connection with FIG. 5. Since neither of the clutching assemblies 9 or 11 are in clutching positions and the gear input shafts 43 will be rotating under the action of the sprocket 65, the gear output shafts 19, upon which the gears 15 and 17 are fixed, will not be operating due to the construction of the shafts 19 and 43 which permit independent rotation of these shafts. Similar operations will occur when one of the other solenoids 20 or 22 is operated to cause rotation of either the gear 15 or 17.

The electrical means for controlling the operation of the three speed transmission may be either manually or automatically operated and includes a key switch 89', a pedal switch 91 which is controlled by the operator of the vehicle when the transmission is being controlled by hand means and this pedal switch is in electrical connection with a solenoid switch 93 through a conductor 95 the solenoid switch being 24 volts. A further switch 97 is provided in the circuit, the operation of which is controlled by the pedal switch 91. When either the automatic operation switch 99 or the manual switch 100 is closed, and if manual switch 100 is closed, then the solenoid 18 is energized and actuated through the conductors 103, 105 and 106, and when this solenoid is actuated, the pressure projection 85 of that solenoid will, through the action of the solenoid armature, enter the recess 85' and apply pressure to the gear input shaft 43 to thereby compress and make operative the clutching mechanism so that the gear output shaft 19 will be actuated. I provide an input governor 107 which controls the first and second speeds and is combined in the circuit to the solenoids 18 and 20 by means of conductors 109, 111 and 113. Solenoid 18 remains actuated until a signal from the governor 107 opens the circuit to the solenoid 18 and closes the circuit, through conductor 109, to cause actuation of the solenoid 20 to thereby change the speed of the output shaft 89 since the gear output shaft 19 is now turning one-third faster than the gear output shaft of the first speed gear. When the solenoid 20 is energized and the solenoid 18 is deenergized through the action of the switch of the input governor 107, the first speed gear is floating freely due to the split shaft 19 and 43 which has been described. It will be recognized that in manual operation when second speed is desired switch 102 is closed, switch 101 being opened.

An output governor 115 is included in the circuit and is connected to solenoid 22 by conductor 117, to switches 99 and 101 by conductors 119 and 121. Where the output shaft 89 with which governor 115 is connected, reaches its speed range, the governor will open the circuit to solenoid 20 and close the circuit to solenoid 22, thus causing clutching mechanism 9 to be operated.

It is to be recognized that the clutches provided in this transmission need not be confined to the electric solenoid operated type. They may be of the air or oil pressure type, operable from the same governor switches by solenoid operated valves to apply air or fluid pressure to this type clutch. Such variations clearly fall within the spirit and scope of this invention.

What is claimed is:

1. An electrically propelled vehicle, including in combination, an electric motor for propelling the vehicle, batteries for powering the electric motor and a variable speed transmission including a gear train, said gear train being an output shaft connected to and being driven by said electric motor to drive the vehicle at different speeds, means, including input sprockets releasably connected to said gear train, one input sprocket being provided for each gear of said gear train, said input sprockets continuously operating when the electric motor is operating each sprocket being connected by a continuous chain to an input sprocket which in turn is connected to said electric motors, the vehicle being propelled at different selected speeds by said gear train while the speed of the electric motor remains constant, a plurality of separate means, to releasably connect each input sprocket with its respective gear of said gear train, controlling means to render any selected separate means operable to cause operative connection of an input sprocket to a gear to cause actuation of said gear while deactuating the other separate means to disconnect the remaining gears of said gear train from the remaining input sprockets so that said remaining gears will be rotated by the gear connected to said selected separate means.

2. An electrically propelled vehicle in accordance with claim 1, wherein each of said separate means comprises a solenoid.

3. An electrically propelled vehicle in accordance with claim 2, wherein said separate means further includes a clutch assembly for each gear of said gear train, each clutch assembly being operatively connected to a gear of the gear train for driving the latter when a clutch assembly is operated to clutching position and each of said solenoids being operable by said controlling means to actuate a clutch assembly to cause operation of the gear.

4. An electrically propelled vehicle in accordance with claim 3, wherein each clutch assembly includes a plurality of clutching elements and a member fixedly connected to the gear, said clutching elements being mounted within said member and compressible thereagainst to cause actuation thereof and said solenoid when energized engages with and compresses said clutching elements causing compression of said elements against said member to produce rotation in the gear.

5. An electrically propelled vehicle in accordance with claim 4, wherein a gear output shaft is fixed to each gear and an axially movable gear input shaft is connected to each sprocket and said gear input shaft is rotated thereby, a pressure member fixed on said gear input shaft and engageable with said clutching elements, said two shafts being relatively rotatable and axially moveable with respect to each other, the solenoid when energized engaging said gear input shaft and causing axial movements thereof with respect to said gear output shaft, the axial movement of said gear input shaft moving said pressure member into compressing engagement with said clutching elements to cause said elements to engage and press against said member which is fixedly connected to the gear to cause rotation of the gear.

6. An electrically propelled vehicle in accordance with claim 5, wherein said solenoid includes an armature, said armature being in axial alignment with said gear input shaft, and said armature being projected from the solenoid upon energization of the latter, the projected armature engaging the gear input shaft and moving it axially relative to the gear output shaft, thereby causing compression of the clutching elements.

7. An electrically propelled vehicle in accordance with claim 6, wherein said armature is provided with a pressure means engagable with said gear input shaft.

8. An electrically propelled vehicle in accordance with claim 7, wherein said pressure means includes a pressure projection and said shaft is provided with a recess, the pressure projection being received in the recess upon energization of the solenoid.

9. An electrically propelled vehicle in accordance with claim 5, wherein said clutching elements comprise a plurality of alternately assembled friction discs and pressure discs, openings provided centrally in said friction and pressure discs and said gear input shaft extending therethrough, the configuration of the openings in said pressure discs and the configuration of said gear input shaft being such that said pressure discs will rotate when said gear input shaft rotates thereby causing rotation of said friction discs, and said friction discs being connected to said member which is fixedly connected to the gear for causing rotation thereof when said friction discs are caused to rotate.

10. An electrically propelled vehicle in accordance with claim 9, wherein said friction and pressure discs are movable axially with respect to said gear input shaft and said member which is fixedly connected to the gear, said member being rotatable with said friction and pressure discs.

11. An electrically propelled vehicle including in combination, an electric motor for propelling the vehicle batteries for powering the electric motor and a variable speed transmission including a gear train, said gear train being connected to an output shaft operable to drive the vehicle at different speeds, means, including input sprockets driven by said electric motor one input sprocket being provided for each gear of said gear train, said input sprockets continuously operating when the electric motor is operating, each sprocket being connected by a continuous chain to an input sprocket which in turn is connected to said electric motor, the vehicle being propelled at different selected speeds while the speed of the electric motor remains constant, a plurality of separate means, interconnecting each input sprocket to its respective; gear of said gear train, and any selected separate means operable to cause operative connection of an input sprocket to a gear to cause actuation of that gear, an electric circuit, each of said separate means being electrically actuated by said electric circuit, said electric circuit including means for separately causing operation of a selected separate means while the remaining separate means are made inoperative, and speed control means connected in said electric circuit and operative to control the speed of certain of said gears of said gear train and of said output shaft.

12. An electrically propelled vehicle in accordance with claim 11, wherein said speed control means is electrically connected to at least two of said separate means and is operable to deactuate one of said separate means when its, gear reaches a preselected speed and to simultaneously actuate the other of said separate means to cause operation of its gear.

13. An electrically propelled vehicle in accordance with claim 12, wherein an output shaft control means is included in said electric circuit and is operable to deactuate the other of said separate means when its gear reaches a preselected speed and to actuate another of said selected means.

14. An electrically propelled vehicle in accordance with claim 13, wherein said output shaft control means is operable to deactuate said another of said separate means when its gear reaches a preselected speed.

15. An electrically propelled vehicle including in combination a constant speed electric motor for propelling the vehicle, batteries for powering said electric motor and an automatic-manual multi-speed transmission for propelling the vehicle at varying speeds in the absence of resistance of or voltage switching varying the speed of the electric motor to vary the speed of the vehicle, said transmission including a gear train consisting of a series of gears having an equal number of teeth, one gear being provided for each vehicle speed, a separate sprocket train consisting of a series of sprockets each having a different number of teeth and said sprockets being constantly rotated when the constant speed electric motor is operating, a sprocket being provided for each gear and each sprocket being connected by a continuous chain to an input sprocket which in turn is connected to said constant speed motor, separate means for each sprocket and said separate means being selectively operable to connect any selected sprocket of said sprocket train to a gear of said gear train, the operation of any selected separate means causing actuation of the gear which is connected to the selected sprocket, and means for causing operation of any selected separate means while preventing the operation of the non-selected separate means whereby the remaining gears will rotate at the same speed as the rotation of the gear which is connected to said selected means.

* * * * *